(12) United States Patent
Sieve et al.

(10) Patent No.: US 11,364,758 B2
(45) Date of Patent: Jun. 21, 2022

(54) CHASSIS COMPONENT FOR A WHEEL SUSPENSION AND METHOD FOR PRODUCING A CHASSIS COMPONENT

(71) Applicant: ZF Friedrichshafen AG, Friedrichshafen (DE)

(72) Inventors: Manfred Sieve, Lohne (DE); Philipp Bronswick, Ostercappeln (DE); Jan Pabst, Osnabrück (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 17/267,564

(22) PCT Filed: Sep. 17, 2019

(86) PCT No.: PCT/EP2019/074799
§ 371 (c)(1),
(2) Date: Feb. 10, 2021

(87) PCT Pub. No.: WO2020/078642
PCT Pub. Date: Apr. 23, 2020

(65) Prior Publication Data
US 2021/0309061 A1 Oct. 7, 2021

(30) Foreign Application Priority Data

Oct. 15, 2018 (DE) ...................... 10 2018 217 641.8

(51) Int. Cl.
*B60G 7/00* (2006.01)
*F16C 11/06* (2006.01)

(52) U.S. Cl.
CPC ............. *B60G 7/001* (2013.01); *B60G 7/005* (2013.01); *F16C 11/0614* (2013.01);
(Continued)

(58) Field of Classification Search
CPC .... B60G 7/001; B60G 7/005; B60G 2204/14; B60G 2204/416; B60G 2206/10; F16C 11/0614
See application file for complete search history.

(56) References Cited

U.S. PATENT DOCUMENTS

| 8,770,606 | B2 | 7/2014 | Lindtner et al. |
| 9,482,268 | B2 * | 11/2016 | Nachbar ............. F16C 11/0633 |
| 10,596,870 | B2 | 3/2020 | Kimura et al. |
| 2013/0025087 | A1 | 1/2013 | Jang et al. |

(Continued)

FOREIGN PATENT DOCUMENTS

| DE | 10 2009 041 478 A1 | 3/2011 |
| DE | 10 2011 054 631 A1 | 1/2013 |

(Continued)

OTHER PUBLICATIONS

International Search Report Corresponding to PCT/EP2019/074799 dated Jan. 7, 2020.
Written Opinion Corresponding to PCT/EP2019/074799 dated Jan. 7, 2020.

*Primary Examiner* — Paul N Dickson
*Assistant Examiner* — Caitlin Anne Miller
(74) *Attorney, Agent, or Firm* — Finch & Maloney PLLC; Michael J. Bujold; Jay S. Franklin

(57) ABSTRACT

A chassis component for a wheel suspension, having a strut arrangement with at least one strut which has a profile with an open cross-section. The at least one strut has a profile base and two wall sections which extend away from the base. An end of the strut has an articulation point that receives a first joint component having a spherical joint body and a second joint component which holds the joint body so as to rotate and/or pivot. A first joint accommodation aperture and a second joint accommodation aperture are arranged, in the area of the articulation point, opposite one (Continued)

another. The joint body is positioned via a circular-segment-shaped fastening element arranged on the joint body between the joint accommodation apertures. The joint accommodation apertures and the joint body positioned between them are integrated in a joint housing produced by overmolding, which forms the second joint component.

15 Claims, 8 Drawing Sheets

(52) U.S. Cl.
CPC ............... *B60G 2204/1162* (2013.01); *B60G 2204/14* (2013.01); *B60G 2204/416* (2013.01); *B60G 2206/10* (2013.01)

(56) References Cited

U.S. PATENT DOCUMENTS

2019/0390705 A1* 12/2019 Nachbar ............. F16C 11/0638
2021/0262517 A1*  8/2021 Bronswick ............. B60G 7/005

FOREIGN PATENT DOCUMENTS

| DE | 10 2011 084 163 A1 | 4/2013 |
| DE | 10 2012 202 989 A1 | 8/2013 |
| DE | 10 2013 002 285 A1 | 8/2014 |
| DE | 10 2016 119 161 B3 | 4/2018 |
| DE | 10 2017 203 540 A1 | 9/2018 |
| EP |     2 266 821 A1  | 12/2010 |
| EP |     3 124 295 A1  | 2/2017 |
| WO |     2005/061911 A1 | 7/2005 |

* cited by examiner

CHASSIS COMPONENT FOR A WHEEL SUSPENSION AND METHOD FOR PRODUCING A CHASSIS COMPONENT

This application is a National Stage completion of PCT/EP2019/074799 filed Sep. 17, 2019, which claims priority from German patent application serial no. 10 2018 217 641.8 filed Oct. 15, 2018.

FIELD OF THE INVENTION

The invention relates to a chassis component for a wheel suspension, comprising a strut arrangement having at least one strut which is in the form of a profile with an open cross-section shape, the at least one strut having a profile base and two wall sections extending away therefrom, wherein at least at one end of the strut an articulation point is provided for receiving two articulation joint components connected movably to one another, namely a first articulation joint component comprising a spherical joint body and a second articulation joint component in the form of a joint housing that holds the joint body in a rotatable and/or pivotable manner, wherein, in the area of the at least one articulation point, the wall sections have first and second joint accommodation apertures which are arranged opposite one another.

Furthermore, the invention relates to a method for producing a chassis component comprising a strut arrangement having at least one strut which is in the form of a profile with an open cross-section shape. The at least one strut has a profile base and two wall sections extending away therefrom. At least at one end of the strut an articulation point is provided for receiving two joint components connected movably to one another, namely a first joint component comprising a spherical joint body and a second joint component in the form of a joint housing that holds the joint body in a rotatable and/or pivotable manner. In the area of the articulation point, the wall sections have joint accommodation apertures which are arranged opposite one another, into which the first joint component is inserted.

BACKGROUND OF THE INVENTION

A chassis component and a method for producing a chassis component of the above-mentioned type are known from DE 10 2013 002 285 A1. The production of the chassis component, in particular the fitting of the joint components connected movably to one another, entails much assembly effort and complexity.

SUMMARY OF THE INVENTION

Starting from the prior art described above, it is now the purpose of the present invention to provide a chassis component and a method for producing a chassis component, characterized by a simplification of the assembly process.

From the device-technological standpoint this objective is achieved starting from the preamble of the independent claim(s) in combination with its characterizing features. From the method-technological standpoint, the objective is achieved starting from the preamble of the independent claim(s) in combination with its characterizing features. The dependent claims that follow these in each case describe advantageous further developments of the invention.

According to the invention, a chassis component for a wheel suspension is provided, which comprises a strut arrangement having at least one strut in the form of a profile with an open cross-section shape, such that the at least one strut has a profile base and two wall sections extending away therefrom, wherein at least at one end of the strut there is an articulation point for receiving two joint components connected movably to one another, namely a first joint component comprising a spherical joint body and a second joint component in the form of a joint housing that holds the joint body in a rotatable and/or pivotable manner. In the area of the at least one articulation point the wall sections have a first joint accommodation aperture and a second joint accommodation aperture arranged opposite one another. To simplify the assembly process, according to the invention it is provided that the joint body is positioned between the first and the second joint accommodation apertures by means of a ring-segment-shaped fastening element arranged on the joint body, wherein the joint accommodation apertures and the joint body positioned between them are integrated in the joint housing, which is produced by overmolding and which forms the second joint component.

The joint body is positioned and held between the joint accommodation apertures, whereby the process of overmolding to produce the joint housing that forms the second joint component is simplified. Owing to the use of overmolding for producing the second joint component there is no longer any need for the assembly steps in which the joint housing is introduced between the joint accommodation apertures and the joint body forming the first joint component is pressed into the joint housing. This is brought about by the integration of the joint accommodation apertures and the joint body, which at the same time provides a shape-enclosing connection between the joint housing and the chassis component. In addition, the effect of the fastening element is that the shrinkage of the joint housing, which is made of plastic, does not result in a change of the axial distance between the joint accommodation apertures, in particular a reduction of the distance.

The first joint component is preferably a body of stable shape. In particular, the first joint component is made of metal. For example, the joint component consists of a ferrous material such as steel.

The chassis component is preferably a body of stable shape. In particular, the chassis component is made of metal. Preferably, the chassis component consists of a ferrous material such as steel. For example, the component body is made from a sheet. In particular, the chassis component is a shaped sheet component.

Preferably, the first joint component can be positioned between the joint accommodation apertures by means of the fastening element, by an insertion-and-rotation lock. The insertion-and-rotation lock enables interlocked holding of the first joint component between the joint accommodation apertures, so that the subsequent overmolding can be carried out reliably. The insertion-and-rotation lock works in the manner of a bayonet fitting.

A longitudinal axis can be associated with the first joint component, which axis also forms a longitudinal axis of the articulation point. A direction transverse to the longitudinal axis or transverse to the axial direction is in particular called a radial direction. A direction running around the longitudinal axis and/or a direction running in the circumferential direction of the joint body is in particular called the circumferential direction.

The joint accommodation apertures have in each case axially extending sections that face toward one another, which are a distance apart with a gap between them. The joint accommodation apertures are preferably each in the form of through-going openings in the sheet of the sidewalls forming the sections. The free ends of the openings are directed toward the inside of the profile, which results in a savings of fitting space.

According to one design, a section of one of the joint accommodation apertures is interrupted in the circumferential direction by at least one radial cut-out and on the external circumference of the fastening element at least one radial projection is provided, which can be inserted into the at least one radial cut-out in the section in the axial direction. The at least one radial projection on the fastening element and the at least one radial cut-out of the joint accommodation aperture are complementary to one another.

In this case, the at least one radial projection of the fastening element can have an essentially hook-shaped or L-shaped contour. The at least one radial projection is guided into the at least one radial cut-out during the introduction of the first joint component into the joint accommodation aperture. Preferably, at least two radial projections and a corresponding number of radial cut-outs can be provided. In particular, the radial projections of the fastening element and the radial cut-outs on the section of the joint accommodation aperture are arranged essentially symmetrically distributed in the circumferential direction. In that way the first joint component can be secured against radial displacement transversely to the longitudinal axis of the joint body.

Preferably, the joint body can be introduced in the axial direction until the at least one radial projection of the fastening element overlaps the opposite section of the other joint accommodation aperture separated by the gap. In that way the opposite section of the other joint accommodation aperture can serve as an axial end-stop for the fastening element when the fastening element is located in the area of the gap between the two joint accommodation apertures. By means of a rotational movement, the at least one radial projection of the fastening element is moved to a position a distance away from the radial cut-out, in which closed areas of the two sections of the joint accommodation apertures are opposite one another. In that way the first joint component is secured against axial displacement in the direction of the second joint accommodation aperture.

According to a further development, the fastening element is arranged on a bearing shell which is arranged on the joint body. The bearing shell is press-fitted onto the joint body and enables the rotatable and/or pivotable holding of the joint body in the joint housing produced by overmolding.

In particular, the bearing shell can have a radially projecting axial stop against which the fastening element is supported. In that case the ring-segment-shaped fastening element can be in the form of a clamping component which is pushed over a partially annular groove in the bearing shell.

According to a preferred embodiment, a sensor can be integrated in the joint housing. By virtue of the sensor, the angular position of the first joint component relative to the second joint component can be determined by an electric evaluation device. The sensor can be in the form of a magneto-resistive sensor. The sensor is then associated with a position magnet let into a seating in the surface of the joint body.

The bearing shell is provided with a recess which serves to hold part of the sensor. In this recess the position magnet associated with the sensor in the form of a magneto-resistive sensor can be accommodated. The sensor has a cylindrical housing, part of which can be inserted into the recess. The housing of the sensor is then essentially flush with the recess so that any penetration of material during the overmolding that produces the joint housing is avoided. A further advantage of this embodiment is that the sensor and the position magnet are distanced from one another only by the wall thickness of the bearing shell in this area. Thus, the integration of the sensor in the joint housing makes for an arrangement with a very small distance to the position magnet.

Preferably, the sections of the joint accommodation apertures can each have oppositely arranged, circular-segment-shaped cut-outs that allow parts of the sensor to be passed through. The circular-segment-shaped cut-outs can also serve to orientate the first joint component or the bearing shell arranged on it, so that after the overmolding a perpendicular orientation of the sensor integrated in the joint housing is ensured. The first joint component positioned by the fastening element after insertion between the two joint accommodation apertures can rotate in the circumferential direction about its longitudinal axis, in order to bring the recess on the bearing shell and the circular-segment-shaped cut-out into an essentially aligned arrangement relative to one another.

Furthermore, the invention relates to a method for producing a chassis component that comprises a strut arrangement having at least one strut, which strut is made as a profile component with an open cross-section shape, wherein the at least one strut has a profile base and two wall sections extending away therefrom, such that at least at one end of the strut an articulation point is provided for receiving two articulation joint components connected movably to one another, namely a first joint component with a spherical joint body and a second joint component in the form of a joint housing that holds the joint body in a rotatable and/or pivotable manner, wherein, in the area of the at least one articulation point, the wall sections have a first joint accommodation aperture and a second joint accommodation aperture which are arranged opposite one another, into which the first joint component is introduced in part, wherein the joint body is positioned between the first and second joint accommodation apertures by a ring-segment-shaped fastening element arranged on the joint body, before the joint accommodation apertures and the joint body between them are integrated in a joint housing produced by overmolding, which housing forms the second joint component. By virtue of the fastening element, on the one hand the joint body is positioned between the joint accommodation apertures before the overmolding process, and on the other hand a prestress is produced between the two wall sections in the area of the articulation point where the joint accommodation apertures are arranged, which prestress counteracts any shrinkage behavior of the joint housing that may occur. The chassis component made as a profile element is preferably made from a stamped part by sheet shaping.

The method can be developed further in line with all the design features explained in connection with the chassis component.

According to a further development, the joint body can be positioned at the articulation point before the overmolding by an insertion-rotational movement of the fastening element. In that way the first joint component can be secured axially and radially against unwanted displacement.

For this, the fastening element is made with at least one radial projection. In addition a section of one of the joint accommodation apertures is made with a cut-out complementary to the radial projection. Together with the fastening element arranged on it, the first joint component is introduced by a plug-in movement in the axial direction into the joint accommodation aperture until the at least one radial projection comes into axial contact with the section of the other joint accommodation aperture. Then, by means of rotational movement in the circumferential direction, the at least one radial projection is moved opposite the at least one cut-out.

Preferably, by virtue of the rotational movement of the fastening element a sensor arranged on the first joint body can be orientated relative to circular-segment-shaped cut-outs opposite one another on the sections of the joint accommodation apertures. On the sensor there is provided in particular a sensor connection component to which a signal line can be connected in order to connect the sensor to an external evaluation device for evaluating the signal.

BRIEF DESCRIPTION OF THE DRAWINGS

An advantageous embodiment of the invention, which will be explained below, is illustrated in the drawings, which show.

DETAILED DESCRIPTION OF THE PREFERRED EMBODIMENTS

Figure 1:
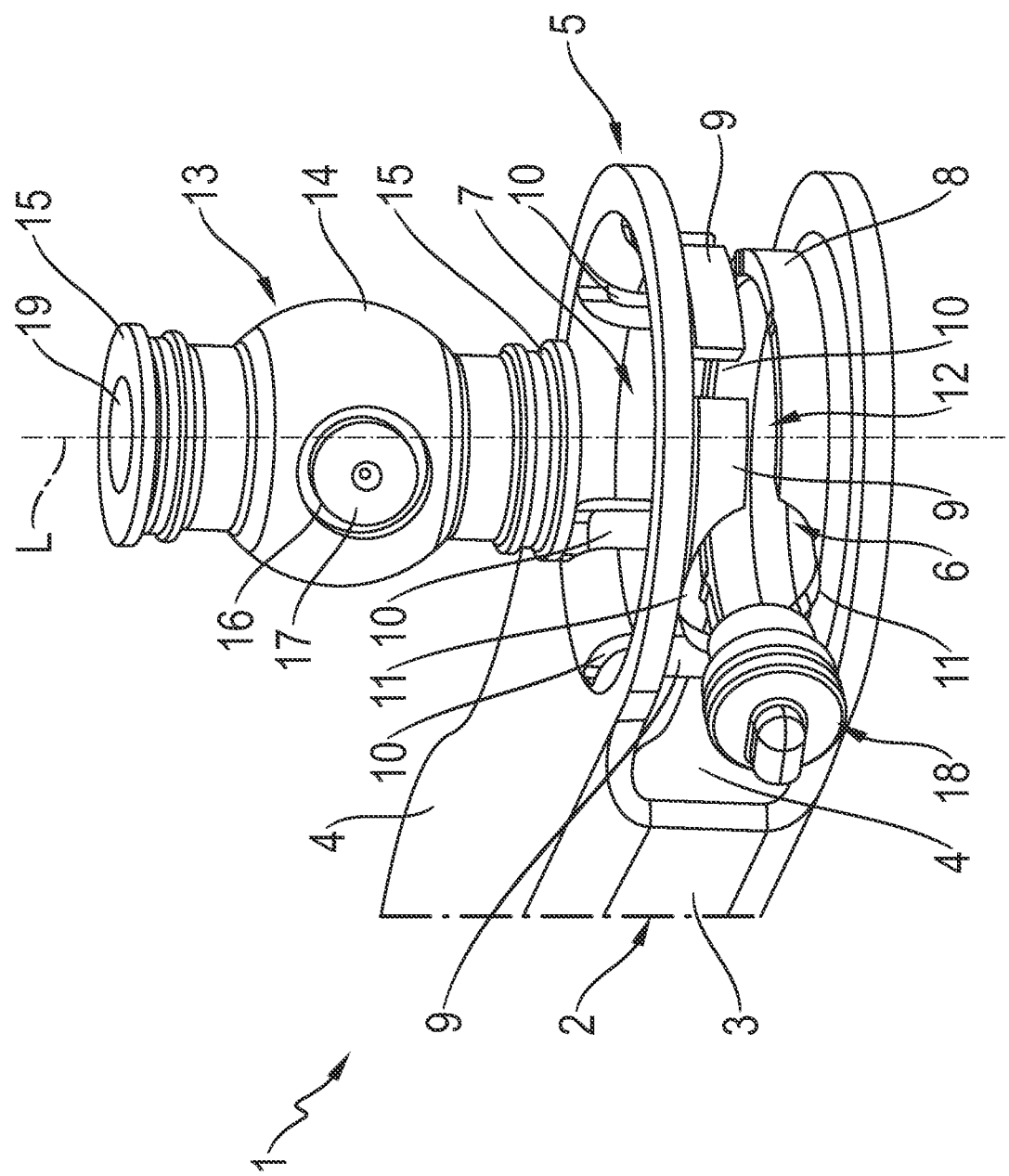
FIG. 1: a partial perspective view of a chassis component with a first joint component.

FIG. 1 shows a partial perspective view of a profiled chassis component 1 with a first joint component 13. In the example embodiment shown, the chassis component 1 is in the form of a two-point control arm. The chassis component 1 comprises a strut arrangement with at least one strut 2, which is in the form of a profiled section with an open cross-section shape. The profiled section is made from a stamped sheet part by a sheet shaping process. The at least one strut 2 has a profile base 3 and two sidewalls 4 that extend away from it. At least in some parts the profiled section can have an essentially U-shaped cross-section. At least at one end of the strut 2 an articulation point 5 is provided for receiving two joint components connected movably to one another, namely a first joint component 13 comprising a spherical joint body 14 and, as a second joint component 30, a joint housing 31 that holds the joint body 14 in a rotatable and pivotable manner. Associated with the first joint component 13 there is a longitudinal axis L, which is also the longitudinal axis of the articulation point 5. A direction transverse to the longitudinal axis L and/or transverse to the axial direction 27 is in particular called a radial direction. A direction that runs around the longitudinal axis L and/or one that runs in the circumferential direction of the joint body 14 is in particular called a circumferential direction.

At the articulation point 5 the strut 2 has a first joint accommodation aperture 6 and a second joint accommodation aperture 7. The two joint accommodation apertures 6 and 7 are preferably each in the form of through-going apertures in the sheet of the sidewalls 4. In this case the free ends of the apertures in the sidewalls 4 of the chassis component 1 are directed toward the inside of the profile. The opening of the first joint accommodation aperture 6 forms an axial section 8 which has an almost closed outer surface interrupted at only one point by a circular-segment-shaped cut-out 11. The opening of the second joint accommodation aperture 7 forms an opposite axial section 9 interrupted by at least one radial cut-out 10, in the example embodiment shown by a plurality of radial cut-outs 10, and by a circular-segment-shaped cut-out 11. The circular-segment-shaped cut-outs 11 of the two joint accommodation apertures 6 and 7 are arranged opposite one another and form an approximately circular opening. The circular opening serves for the insertion and positioning of a sensor 18 in the articulation point 5. The axial sections 8 and 9 opposite one another are separated from one another by a gap 12. The sensor 18 is a magneto-resistive sensor.

On its spherical joint body 14 the first joint component 13 has two cylindrical protrusions 15, between which the joint body 14 is arranged. On the surface of the joint body 14 a circular cylindrical recess 16 is provided, into which a positioning magnet 17 is set. The joint body 14 and the protrusions 15 have a through-going bore 19.

Figure 2:
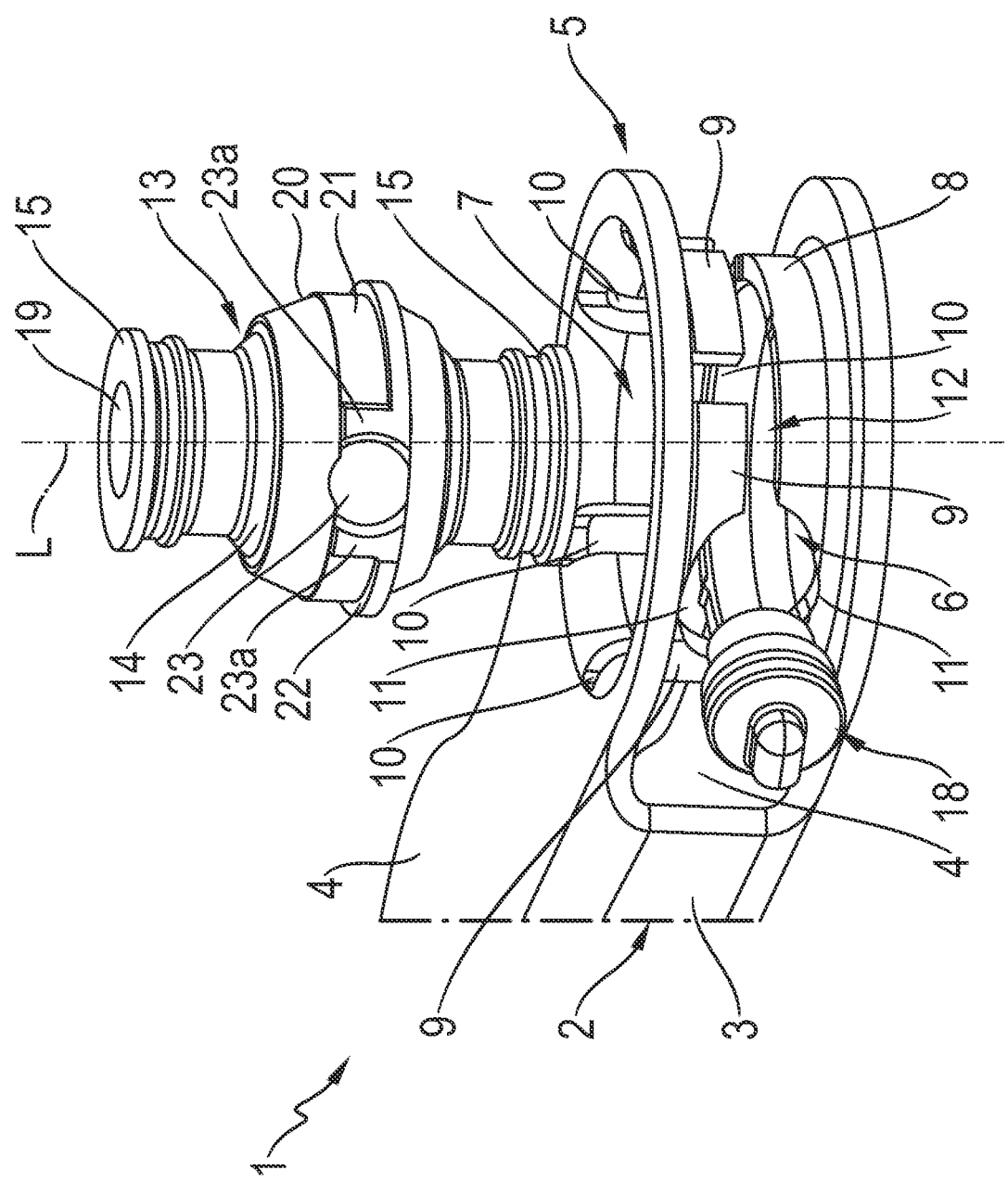
FIG. 2: a partial perspective view of the chassis component shown in FIG. 1, with a bearing shell press-fitted onto the first joint component.

FIG. 2 shows partial a perspective view of the chassis component 1 shown in FIG. 1, with a bearing shell 20 press-fitted onto the first joint component 13. The bearing shell 20 is provided with a partially annular groove 21, which is interrupted by an in particular circular cylindrical opening 23. A radially projecting axial stop 22 on the outer surface of the bearing shell 20 delimits the groove 21 in the axial direction. Wall sections 23a, which delimit the opening 23, delimit the partially annular groove 21 in the radial direction. The bearing shell 20 is positioned on the joint body 14 in such manner that the opening 23 is arranged flush with the recess 16 in the joint body 14.

Figure 3:
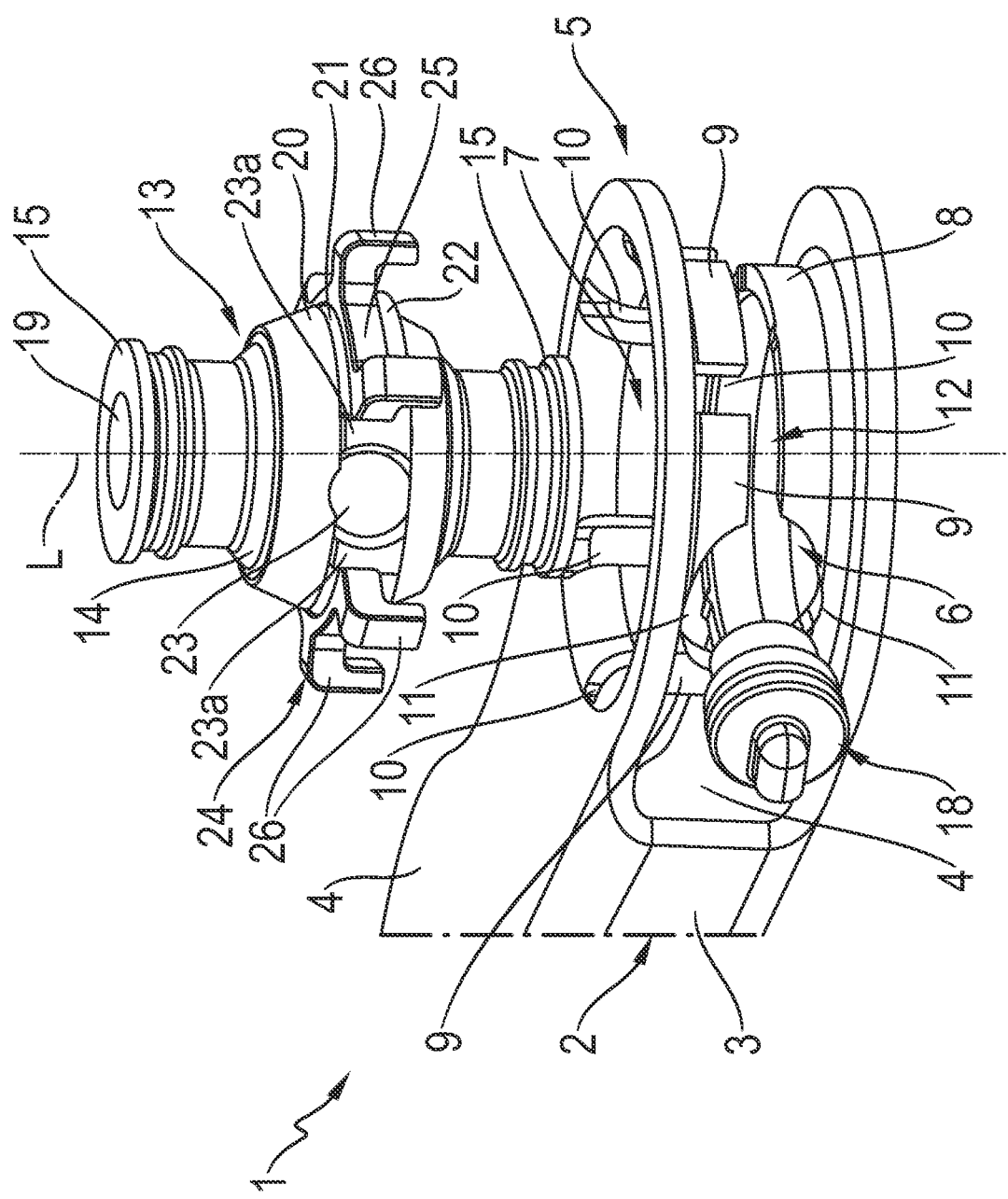
FIG. 3: a partial perspective view of the chassis component shown in FIG. 2, with a fastening element arranged on the bearing shell.

FIG. 3 shows a partial perspective view of the chassis component shown in FIG. 2, with a fastening element 24 on the bearing shell 20. The fastening element 24 has an essentially annular basic body 25 on which radial projections 26 are arranged. The radial projections 26 are essentially hook-shaped or L-shaped. The number of radial projections corresponds to the number of cut-outs 10 in the section 9 of the second joint accommodation aperture 7. The radial projections 26 are formed to be complementary to the cut-outs 10. The fastening element 24 consists of plastic and can have some elasticity that enables it to be pushed over the groove 21. The fastening element 24 is pushed onto the bearing shell 20 until it comes into contact against the radially projecting axial stop 22. The fastening element 24 is held in the groove 21 by a clamping effect. In the circumferential direction the fastening element 24 can be secured against rotating by the two wall sections 23a of the opening 23 which interrupt the groove 21. The fastening element 24 can be arranged on the bearing shell 20 before or after the bearing shell 20 is pressed onto the joint body 14.

Figure 4:
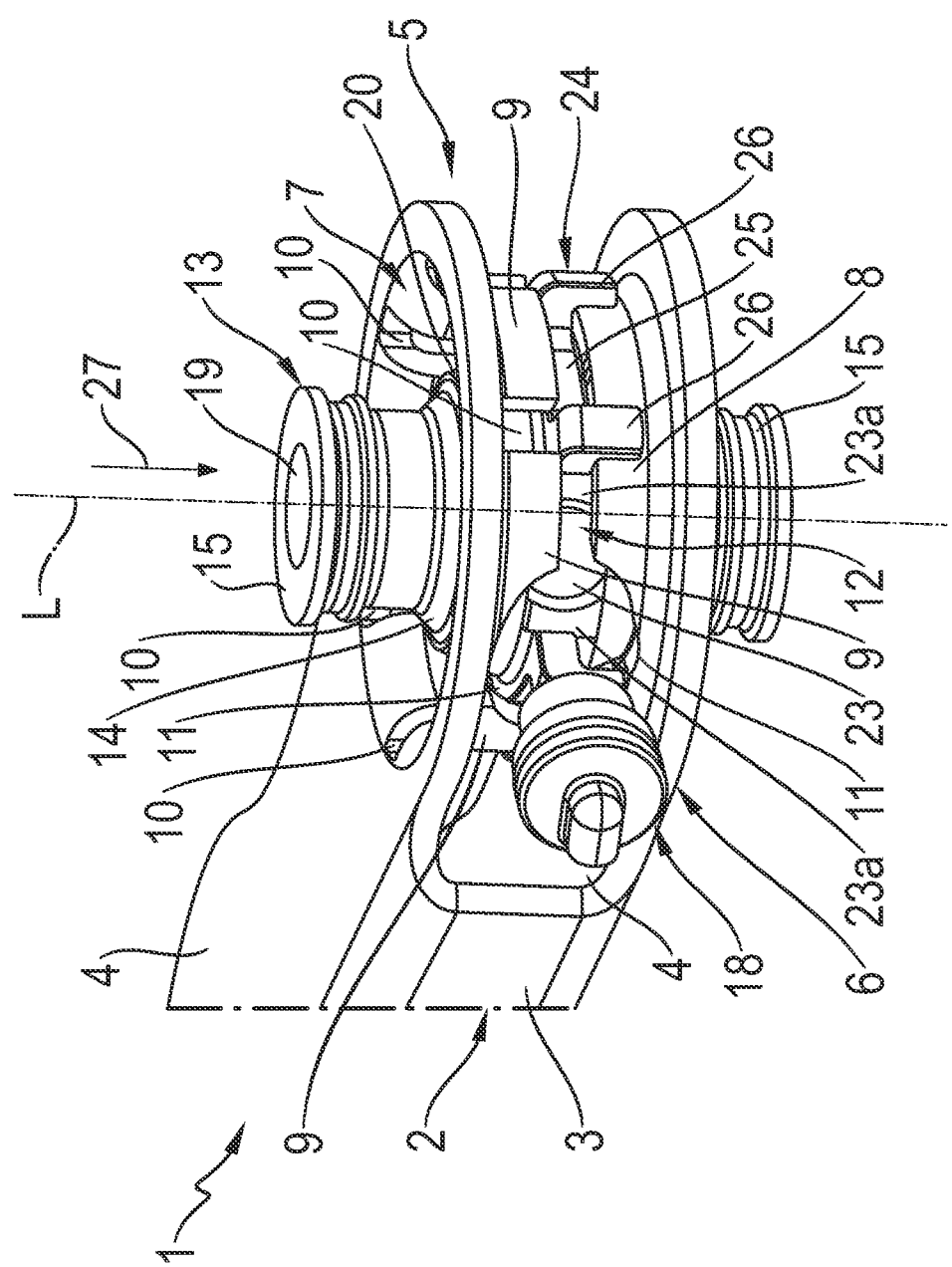
FIG. 4: a partial perspective view of the chassis component shown in FIG. 3, with the first joint component positioned between the joint accommodation apertures.

FIG. 4 shows a partial perspective view of the chassis component 1 shown in FIG. 3, with the first joint component 13 positioned between the first joint accommodation aperture 6 and the second joint accommodation aperture 7. The joint component 13 is inserted in the axial direction 27, through the second joint accommodation aperture 7, into the articulation point 5. The radial projections 26 are guided in the axial direction 27 into the corresponding cut-outs 10 in the section 9, until the projections 26 make contact with the section 8. The section 8 is enclosed with interlock in sections by the essentially hook-shaped or L-shaped projections 26. In this way the first joint component 13 is secured between the first joint accommodation aperture 6 and the second joint accommodation aperture 7, against any radial displacement relative to the longitudinal axis L. At the same time, the insertion movement in the axial direction 27 is limited thereby.

Figure 5:
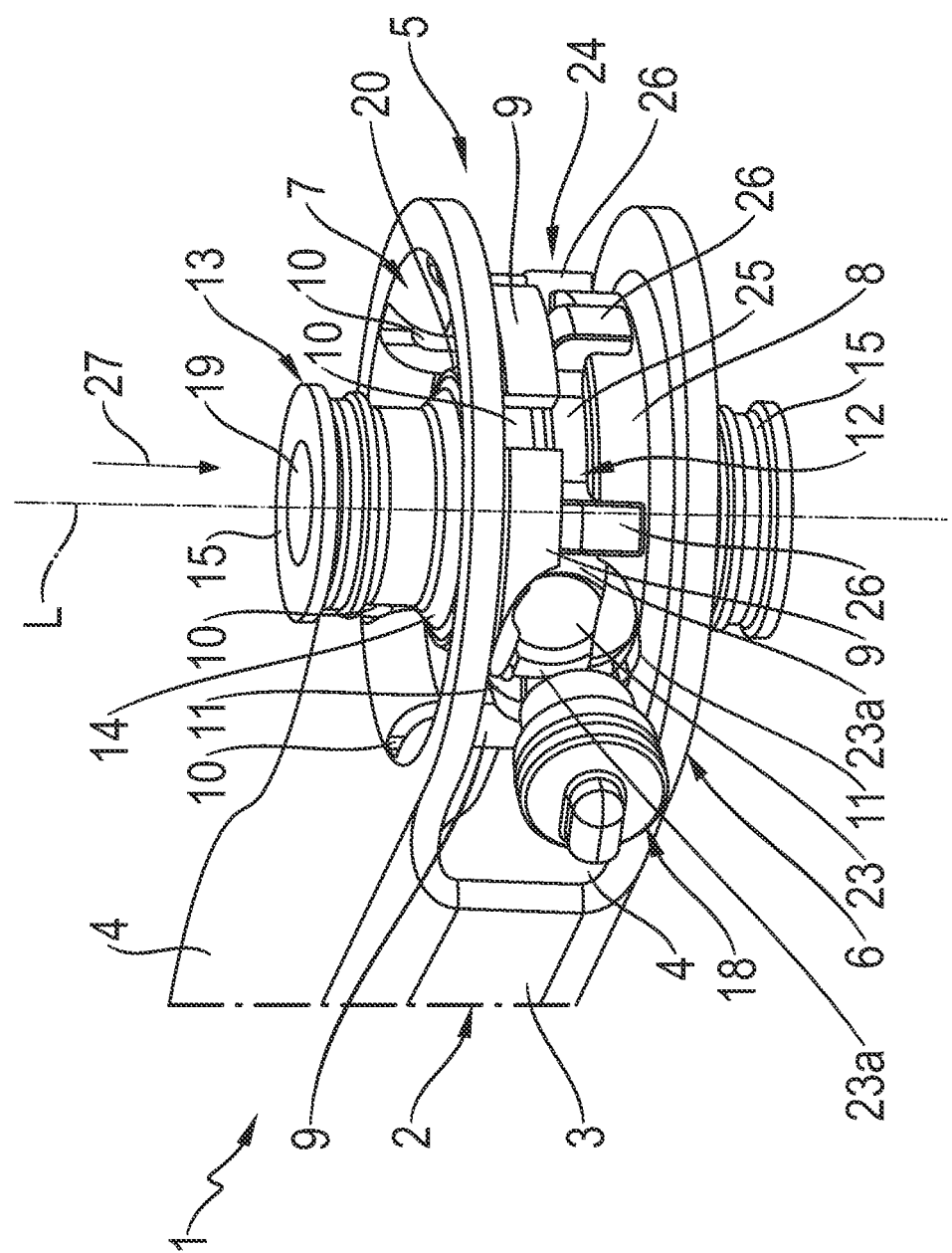
FIG. 5: a partial perspective view of the chassis component shown in FIG. 4, with a first joint component secured against axial displacement between the joint accommodation apertures.

FIG. 5 shows a partial perspective view of the chassis component 1 shown in FIG. 4, with the first joint component 13 secured against axial displacement between the joint accommodation apertures 6 and 7. For this, the first joint component 13 is rotated in sections about its longitudinal axis L in the circumferential direction. By virtue of this rotation the radial projections 26 in the gap 12 are moved away from the area of the cut-outs 10 in the section 9 of the second joint accommodation aperture 7 to an area in which the sections 8 and 9 of the first and second joint accommodation apertures 6 and 7 have no interruptions. In that way the first joint component 13 is additionally secured against any axial movement along the longitudinal axis L. The rotation of the first joint component 13 and the fastening element 24 arranged rotationally fixed on it in the circumferential direction takes place until the opening 23 is essentially aligned with the circular-segment-shaped cut-outs 11.

Figure 6:
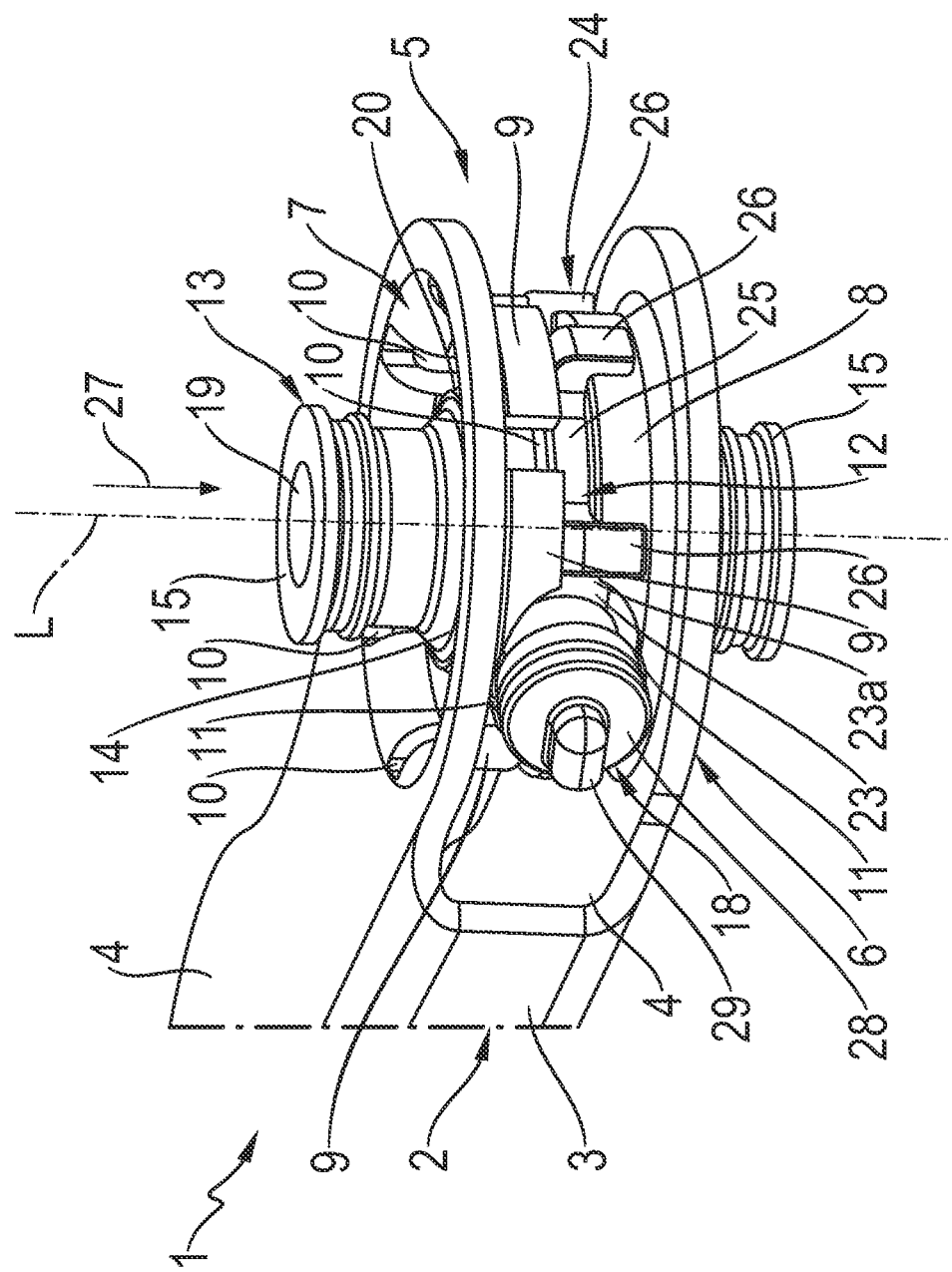
FIG. 6: a partial perspective view of the chassis component shown in FIG. 5, with a sensor arranged in a recess of the bearing shell.

FIG. 6 shows a partial perspective view of the chassis component 1 shown in FIG. 6, with the sensor 18 fitted into the opening 23 of the bearing shell 20. The sensor 18 has a cylindrical sensor housing 28. At its end facing toward the opening 23 the sensor housing 28 has an outer diameter that corresponds to the inside diameter of the opening 23. At the opposite end of the sensor housing 28 there is arranged a connection point 29 which serves for the connection of a signal line. When the sensor housing 28 is partially inserted into the opening 23, the sensor housing 28 completely seals the opening 23 in the circumferential direction. At the same time the sensor 18 is orientated relative to the first joint component 13. The distance between the sensor 18 and the position magnet 17 then corresponds essentially to the wall thickness of the bearing shell 20 in the area of the opening 23.

Figure 7:
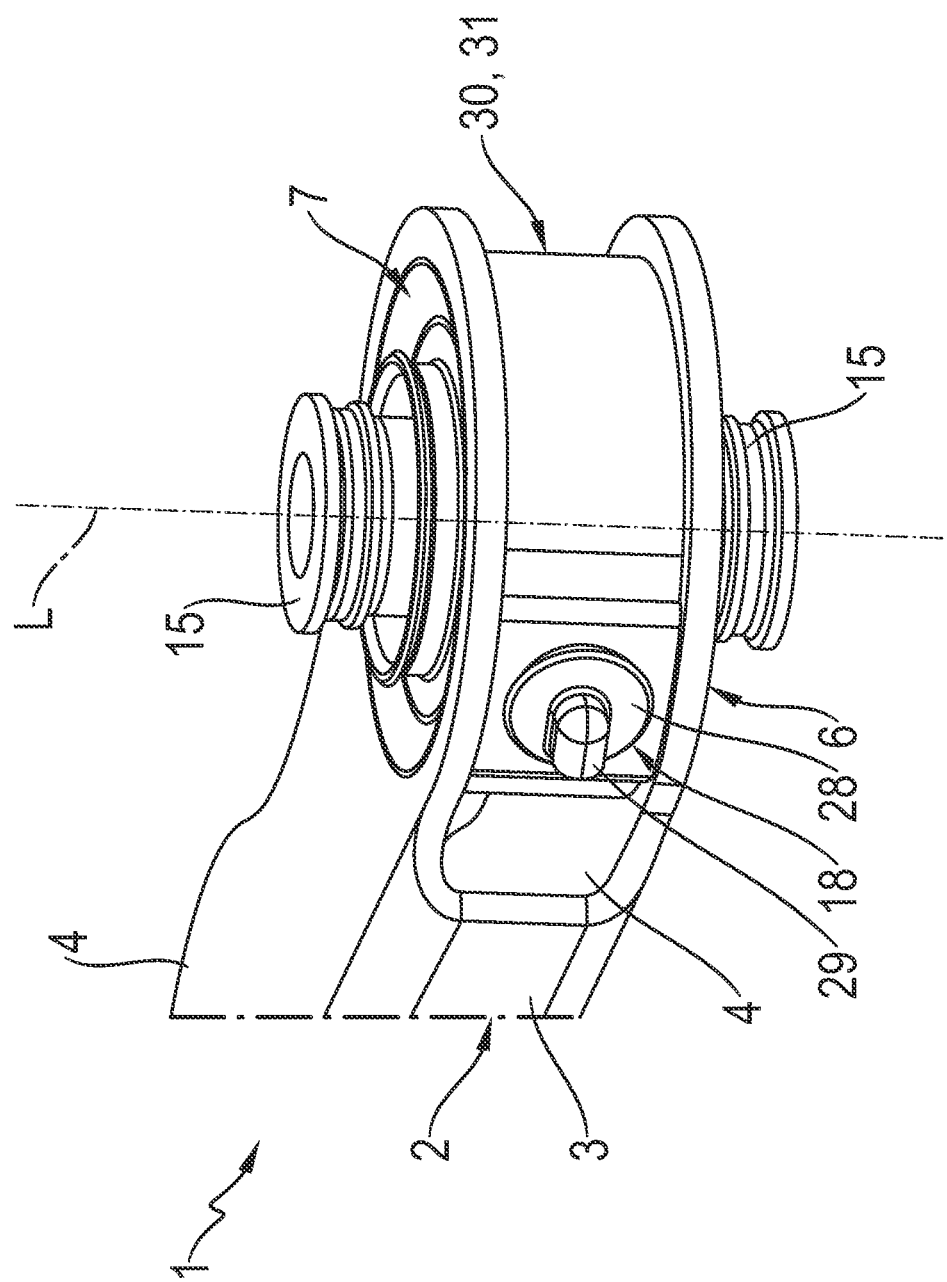
FIG. 7: a partial perspective view of the chassis component shown in FIG. 6, with a joint housing made by overmolding as the second joint component.

FIG. 7 shows a partial perspective view of the chassis component 1 shown in FIG. 6, with a joint housing 31, as the second articulation component 30, made by overmolding with plastic. For this, the chassis component 1 with the first joint component 13 fastened within it is placed into at least one die. The area between the first joint accommodation aperture 6 and the second joint accommodation aperture 7, and outside areas of the respective joint accommodation apertures 6 and 7, are overmolded around the joint body 14 of the first joint component 13 covered by the bearing shell 20. In that way the joint accommodation apertures 6 and 7 and the first joint body 13 with the sensor 18 arranged on it, positioned between them, are integrated in the joint housing 31. The bearing sleeve 20, the fastening element 24 and the sections 8 and 9 of the joint accommodation apertures 6 and 7 prevent any plastic from making its way into the area of the first joint body 14 during the overmolding process, which would block rotation and pivoting movement between the first joint body 14 and the second joint body 30.

An approach toward one another of the oppositely positioned joint accommodation apertures 6 and 7, due to shrinkage of the joint housing 31 made by overmolding as it cools, is countered by the fastening element 24 arranged between the joint accommodation apertures 6 and 7. By virtue of the fastening element 24 a prestress directed in the axial direction 27 is produced between the two wall sections 4 in which the joint accommodation apertures 6, 7 are formed, and this counteracts the shrinkage behavior.

Figure 8:
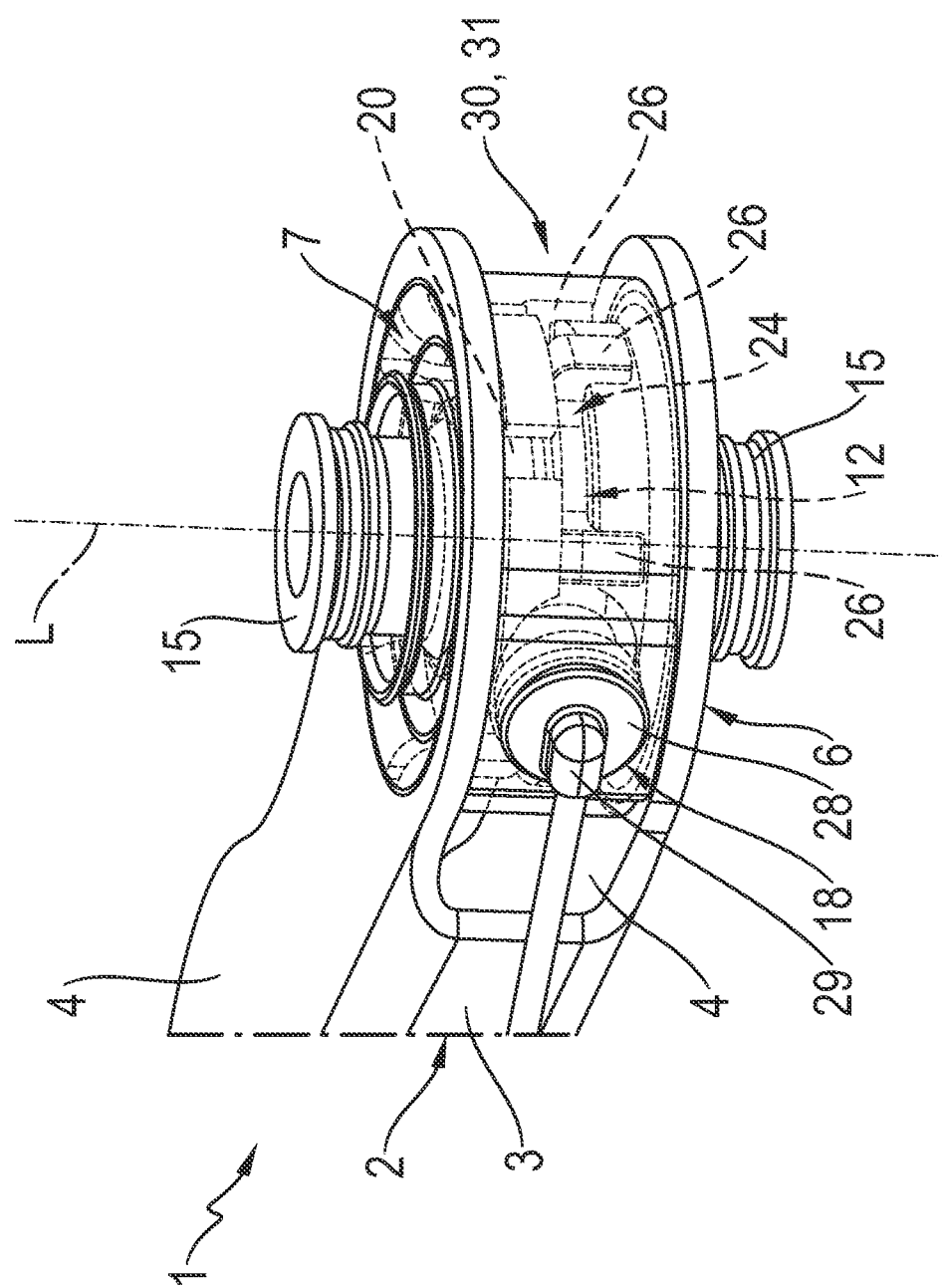
FIG. 8: a partial perspective view of the chassis component shown in FIG. 7, with the joint housing represented as transparent.

FIG. 8 shows a partial perspective view of the chassis component 1 shown in FIG. 7, with the joint housing 31 represented as transparent. This serves to make clear that only the areas of the joint body 14 covered by the bearing shell 20 between the first and second joint accommodation apertures 6 and 7, and the outsides of the two joint accommodation apertures 6, 7, are overmolded. Thanks to the fastening element 24 the width of the gap 12 between the first and second joint accommodation apertures 6 and 7, or the axial distance between them, is kept the same.

INDEXES

1 Control arm
2 Strut
3 Profile base
4 Sidewall area
5 Articulation point
6 First joint accommodation aperture
7 Second joint accommodation aperture
8 Section of 6
9 Section of 7
10 Radial cut-out
11 Circular-segment-shaped cut-outs
12 Gap
13 First articulation joint component
14 Joint body
15 Protrusion
16 Cut-out
17 Position magnet
18 Sensor
19 Through-going bore
20 Joint sleeve
21 Groove/contact surface
22 Axial stop
23 Opening
23a Wall section
24 Fastening element
25 Basic body
26 Radial projection
27 Axial direction
28 Sensor housing
29 Connection point
30 Second articulation joint component
31 Joint housing

The invention claimed is:

1. A chassis component for a wheel suspension comprising:
  a strut arrangement with at least one strut being in a form of a profile with an open cross-section, and the at least one strut comprising a profile base and two wall sections that extend away therefrom,
  an articulation point being provided, at least at a first end of the at least one strut, for receiving first and second joint components movably connected to one another,
  the first joint component having a spherical joint body and the second joint component holding the joint body at least one of rotatably and pivotably, the two wall sections, in an area of the at least one articulation point, having a first joint accommodation aperture and a second joint accommodation aperture arranged opposite to one another, the joint body being positioned, by a circular-segment-shaped fastening element arranged on the joint body, between the first and the second joint accommodation apertures, the first and the second joint accommodation apertures and the joint body, positioned therebetween, being integrated in a joint housing produced by overmolding, and the joint housing forming the second joint component.

2. The chassis component according to claim 1, wherein the first joint component is positioned between the first and the second joint accommodation apertures by the fastening element, via a plug-in and rotation lock.

3. The chassis component according to claim 1, wherein the first and the second joint accommodation apertures each have respective axially extending sections separate from one another by a gap.

4. The chassis component according to claim 3, wherein a section of one of the first and the second joint accommodation apertures is interrupted, in a circumferential direction, by at least one radial cut-out and, on an outer circumference of the fastening element, at least one radial projection (26) is provided, which is insertable through the at least one radial cut-out in the section.

5. The chassis component according to claim 4, wherein the at least one radial projection of the fastening element has one of a substantially hook-shaped or L-shaped contour.

6. The chassis component according to claim 5, wherein the joint body is insertable, in an axial direction, until the at least one radial projection of the fastening element overlaps at least one of the axially extending sections of the other joint accommodation aperture separated therefrom by the gap.

7. The chassis component according to claim 1, wherein the fastening element is arranged on a bearing shell, which is arranged on the joint body.

8. The chassis component according to claim 7, wherein the bearing shell has a radially projecting axial stop against which the fastening element is supported.

9. The chassis component according to claim 1, wherein a sensor is integrated in the joint housing.

10. The chassis component according to claim 9, wherein the bearing shell is provided with an opening, which serves for partial accommodation of the sensor.

11. The chassis component according to claim 9, wherein sections of the first and the second joint accommodation apertures each have oppositely arranged circular-segment-shaped cut-outs for partial insertion of the sensor.

12. A method of producing a chassis component having a strut arrangement with at least one strut which is made as a profiled component with an open cross-section, the at least one strut has a profile base and two wall sections that extend away therefrom, an articulation point is provided, at least at a first end of the strut, for receiving first and second joint components movably connected to one another, the first joint component having a spherical joint body and the second joint component holds the joint body at least one of rotatably and pivotably, in an area of the at least one articulation point, the two wall sections have, arranged opposite to one another, a first joint accommodation aperture and a second joint accommodation aperture, into which the first joint component is partially inserted, the method comprising:

positioning the joint body between the first and the second joint accommodation apertures by a ring-segment-shaped fastening element arranged on the joint body before the first and the second joint accommodation apertures and the joint body between them are integrated in a joint housing which is produced by overmolding and which forms the second joint component.

13. The method according to claim 12, further comprising positioning the joint body by a plug-in and rotation movement of the fastening element.

14. The method according to claim 13, further comprising
manufacturing the fastening element with at least one radial projection,
manufacturing a section of the second joint accommodation aperture with at least one cut-out complementary to the radial projection,
inserting the first joint component with the fastening element arranged thereon in an axial direction into the second joint accommodation aperture by a plug-in movement until the at least one radial projection rests axially against a section of the first joint accommodation aperture, and
moving the at least one radial projection opposite the at least one cut-out by a rotational movement in a circumferential direction.

15. The method according to claim 13, further comprising, relative to circular-segment-shaped cut-outs opposite one another in sections of the first and the second joint accommodation apertures, orienting a sensor arranged on the joint body by the rotational movement of the fastening element.

* * * * *